July 19, 1960     H. E. SNYDER     2,945,655
DOUBLE SKIN AIRFOIL STRUCTURE
Filed Jan. 20, 1956     2 Sheets-Sheet 1
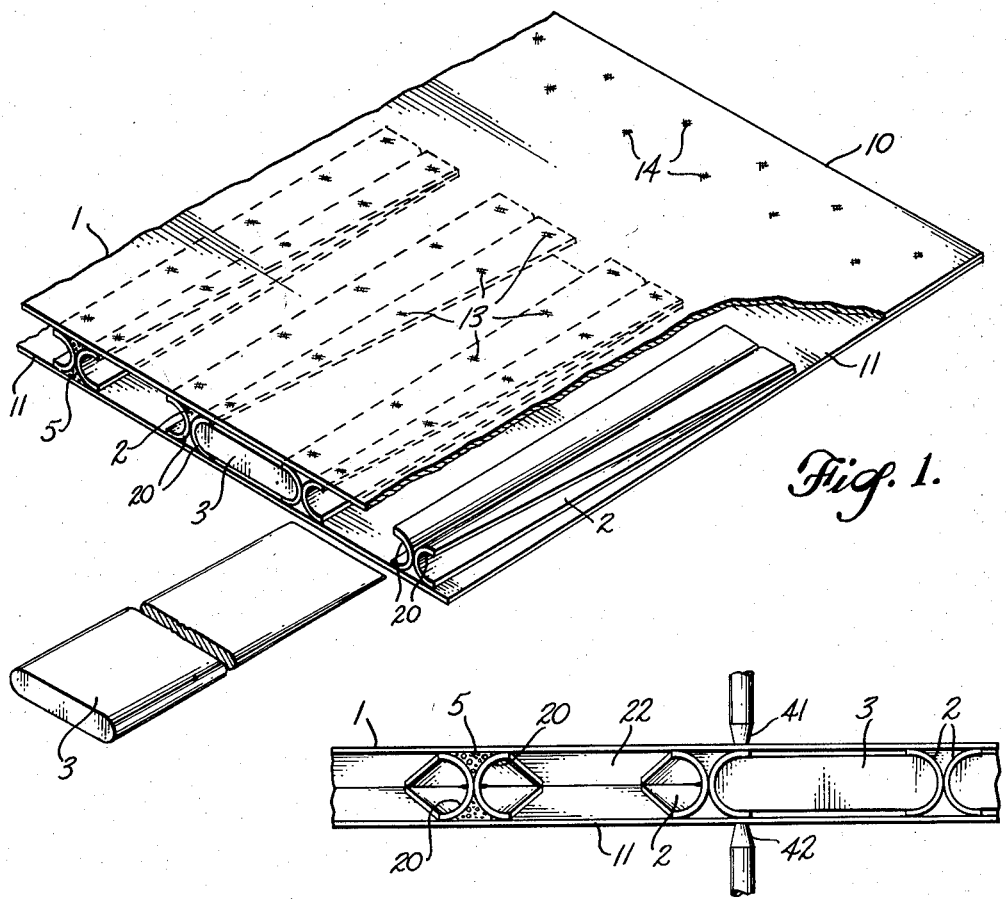
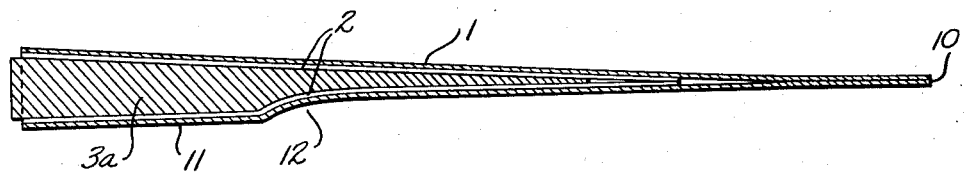
INVENTOR.
HOWARD E. SNYDER
BY
Reynolds, Beach + Christensen
ATTORNEYS

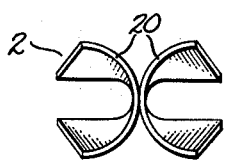
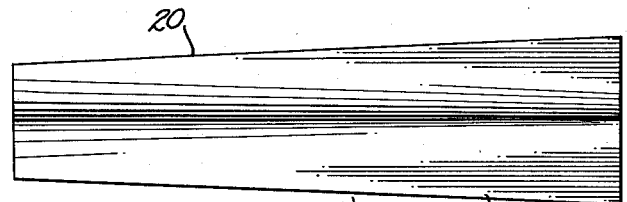
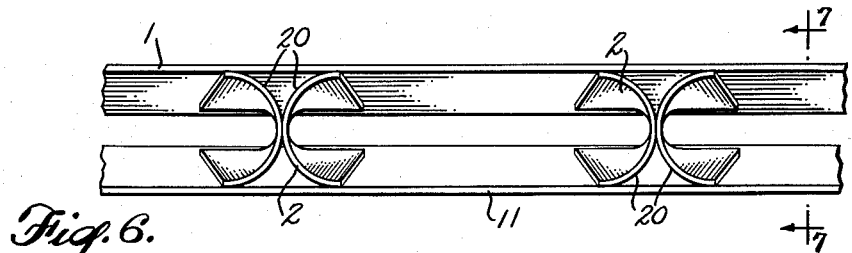
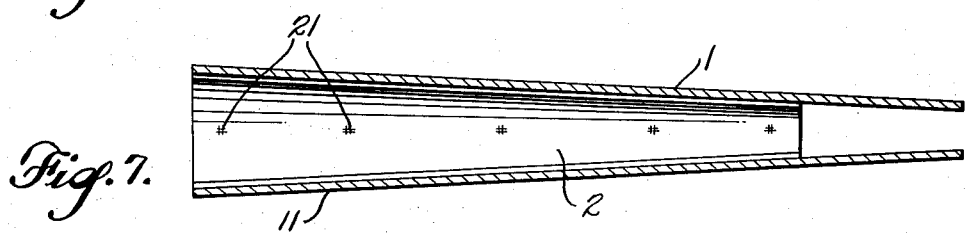
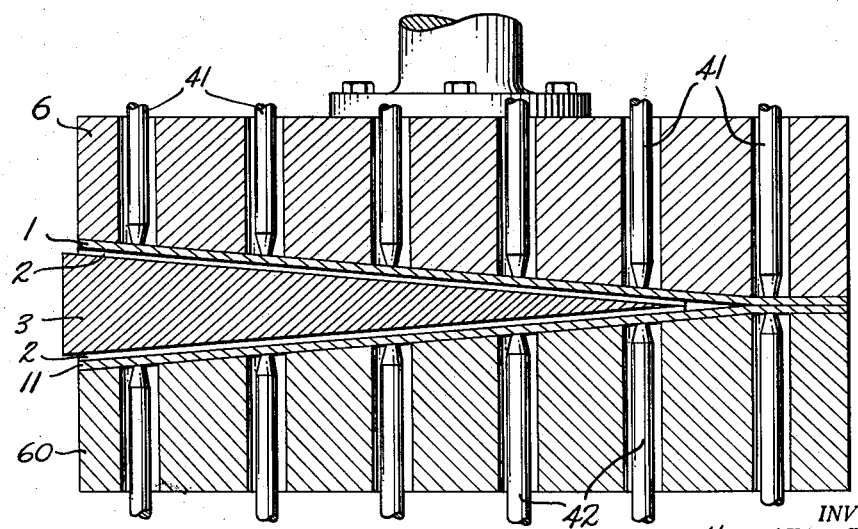

United States Patent Office 2,945,655
Patented July 19, 1960

2,945,655

DOUBLE SKIN AIRFOIL STRUCTURE

Howard E. Snyder, Mercer Island, Wash., assignor to Boeing Airplane Company, Seattle, Wash., a corporation of Delaware Filed Jan. 20, 1956, Ser. No. 560,445

5 Claims. (Cl. 244—123)

All airfoil elements taper at the trailing edge to some minimum thickness, where the upper and lower skins (in the case of a horizontally disposed airfoil) converge at a slight angle. Some designs of airfoil require knife-edge sharpness, while other designs can be more blunt, but regardless of the degree of edge sharpness, because of the small angle and slight distance between the skins it has been difficult to effect joining operations except as the interior framework is first built up completely, and then the skins are applied thereto. In particular it has been considered impractical to do otherwise when the entire airfoil is of extreme thinness, as in the case of high speed airfoils, in the supersonic range.

The present invention concerns the assembling, forming, and securing of all the components of the framework and the two skins of a structure of this general type in a single operation, and is particularly well suited for use in the trailing edge structure of a thin-section airfoil, and is illustrated as applied to such a trailing edge structure. Little, if any, preliminary assembly needs to be done, other than in the typical embodiment shown, the securement of components of individual stiffeners, in the form preferably used, in a certain back to back relationship, and even that is more a convenience than a necessity. This invention relates to such a trailing edge structure.

An advantage flowing from this invention, in addition to saving of time and lessening of manufacturing costs, is the simplification and lightening of the structure as a whole.

By eliminating much relatively massive interior structure, and leaving long freely open chambers or channels within and extending virtually to the tips of the trailing edge structure, it would be possible, if needed, to employ such channels for circulation of a coolant, to counter frictionally induced high temperatures associated with high air speeds.

Because the forming operation and the securing operation are coincident, good contact is assured throughout the structure, and this is particularly necessary where securement is effected by a welding operation.

Specific reference has been made above to trailing edge structures, since the invention is particularly useful in places where, as in trailing edges, the skins converge and where, usually, they merge, so that the skins are close together for a considerable distance. The invention is almost equally advantageous in other edge structures, as for example, in wing tip structures, and retains many of its advantages even if used in panels with more or less parallel skins that are so close together that it is difficult to work within the intervening space. Removable panels or doors are examples of the latter usage. The reference to trailing edge structures is intended to be general, since the structure of this invention is usable not only in the trailing edge of a wing, but in control surfaces, empennage fixed surfaces and the like.

The principles of the invention are illustrated in typical constructions in the accompanying drawings, and will be more fully explained in this specification and defined in the appended claims.

Figure 1 is an isometric view, partly broken away, of a typical portion of a trailing edge structure assembled, formed and secured in accordance with the present invention.

Figure 2 is an edge view of the same, looking rearwardly, and illustrating diagrammatically a step in the process of its manufacture.

Figure 3 is a longitudinal or chordwise sectional view through a somewhat modified trailing edge structure built according to the principles of this invention.

Figure 4 is an end elevation, and Figure 5 a top plan view, of an individual stiffener element, prior to its incorporation into the trailing edge structure.

Figure 6 is an edge view of two such stiffeners and the opposite skins, laid up preparatory to the forming and securing operations, and Figure 7 is a longitudinal sectional view of this assembly, taken at the line 7—7 of Figure 6.

Figure 8 is a view comparable in viewpoint to Figure 7, but illustrating the simultaneous forming and securing operations nearing completion.

According to the present invention, the trailing edge structure consists of a series of preformed stringers or stiffeners, each of approximately X-shape in cross-section, disposed in spaced generally parallel relationship and transversely to the trailing edge, sandwiched between an upper skin and a lower skin (or, if the trailing edge is intended to be disposed in use in an upright position, then between a port and a starboard skin). It is immaterial whether the stiffeners, to start with, are of like cross-sectional size and shape throughout their length. They may be, for example, semicylindrical, placed back to back and preferably secured in that relationship, and somewhat flattened towards one end. If in flattening they spread too widely, they may be trimmed off at the edges. It is to be emphasized that it is not necessary to give them their final shape in advance of assembling, for this final shaping desirably occurs during assembling; rather, the cross-sectional shape of the stringers is preferably changed by applying pressure to them, most heavily in the vicinity of the trailing edge, and applied through the skins, during the application thereto of the skins, the pressure acting to flatten the arms of the stiffeners more and more towards the trailing edge, until at the trailing edge they become substantially flat, and there the arms approach closely or come into contact with one another. Preferably, the skins extend past the ends of the stiffeners and themselves come into contact at the trailing edge. Thus progressively flattened into and held in a tapered form, the stiffeners and the skins are secured together, normally at a multiplicity of points, and by a process such as spot welding or brazing. This provides a light yet quite rigid trailing edge structure in which the interconnected thicknesses of the skins defines the extreme trailing edge, and inwardly thereof the structure is no thicker than sufficient to allow room for the thicknesses of the flattened arms of the stiffeners. These arms progressively spread apart from their rear ends forwardly, but always remain in continuous contact with the skins. The increasingly thick cross-section of the stiffeners as a whole defines the thickness of the trailing edge structure, but leaves tapered or wedge-shaped recesses. These recesses may be wholly separate from one another, or apertures (not shown) may be formed in their web portions whereby they may be cross-connected in the vicinity of the trailing edge, to define conduits for circulation of coolant, if this is deemed necessary, or to further lighten the structure.

The constant taper described may be modified if the structure is recessed, as suggested in Figure 3.

Typical trailing edge structures and a method of making the same are shown in the drawings, and will be described now by way of example.

The finished trailing edge structure, speaking generally, consists of a plurality of parallel stringers, spaced apart spanwise, and spacing apart two skins, all being integrally connected as by spot welding. Figures 4 and 5 illustrate such a stringer 2, before it has been incorporated in the structure. It consists, preferably, of two general semicylindrical troughs 20, placed back to back, and preferably, although not necessarily, held in that relationship by a preliminary joining operation, as by spot welding at 21, and with the arms of the so-formed X-shaped stiffener flattened somewhat towards one end; see Figures 4 and 7. Since the arms of the stringers must be deformable, it is preferred that they be made of malleable sheet metal, rather than as extrusions, for example.

A number of such stringers are sandwiched between an upper skin sheet 1 and a lower skin sheet 11, as in Figure 6, and the stringers may be held in correct orientation and spacing by the interposition of wedge-shaped mandrels 3 between successive stringers. Such spacer mandrels serve the further purpose of limiting the subsequently described flattening deformation of the stringers. The sandwich is then squeezed between upper and lower forming platens 6 and 60 (Figure 8) which converge in a manner to deform the trailing ends of the stringers 2, by pressure applied through the skins 1 and 11. Ordinarily the shape of the platens would be such that the rear ends of the stringers would be flattened until their arms contact, and the skins themselves would come into contact at the extreme trailing edge. The mandrels 3 will prevent excessive stressing and deformation of the stringers, and will effect proper shaping thereof, such for instance as the recessed form of Figure 3.

Still retaining parts under pressure, and the arms of the stringers stressed, electrode pairs 41 and 42 are brought into contact with the skins 1 and 11, along the lines of the flattened stringer arms, as indicated by the spot welds at 13 in Figure 1. The mandrels 3, still in place, are electrically conductive, serve as dummy electrodes, and afford adequate resistance to pressure such as the welding operation requires.

Now, upon release of the pressure upon the assembly, and removal of the mandrels 3 or 3a, the trailing edge structure may be considered complete. It is accurately and rigidly held in assembled relationship, and it is strong yet light. No further operations are necessary, yet if desired, a foaming plastic may fill certain of its spaces, or, in the case of high speed aircraft a foamed ceramic, resistant to high temperatures, may be used, to assist in stiffening and bonding it together. Such foamed material is shown at 5 in Figure 2, in the approximately triangular spaces bounded by the arms of the stiffeners and the respective skins. The spaces 22 occupied by the mandrels might also or alternatively be filled with the foamed material, if desired.

The manner of supporting or securing the trailing edge structure thus described to forward structure of the airfoil has not been described, inasmuch as it is not considered to constitute a part of the present invention, and securement may be accomplished by any of a number of expedients such as are well known in the art, or capable of accomplishment by one skilled in this art.

If similar principles are used in the construction of other types of panels, such as may differ from the trailing edge structure used to illustrate these principles primarily in that the inner and outer skins are more nearly parallel than converging, it is clear that the flattening of the stringers in like degrees in different parts of their length is purely a matter of degree than a difference in kind, yet such stringers can still be pressed down between the skins, and fixed in position by such a step as spot welding, when all parts have attained their intended positional relationship. The broad principles of the invention are not to be understood as limited to the making of trailing edge structures or the like, wherein the skins converge, but since the invention is peculiarly suited for use in making such trailing edge structures, this particular application of the invention is also specifically claimed.

I claim as my invention:

1. A lightweight panel comprising an upper and a lower skin spaced apart by a given distance, a plurality of stiffeners of malleable material each including arms diverging approximately in X-shape in cross section, said stiffeners being spaced apart in the direction of the breadth of said skins, and disposed with their arms in contact with said skins, the arms of the stiffeners when unstressed being spread apart, in the direction from skin to skin, by a distance in excess of such given distance, but said arms being under stress and as a result lying closer together than such distance, and means bonding together the skins and the stiffeners in their so-stressed relationship as a rigid, unitary structure.

2. A lightweight panel as in claim 1, useful as the trailing edge structure of an airfoil, and in use extending along such trailing edge, wherein the stiffeners are spaced transversely along the trailing edge, and each stiffener has its arms spaced at graduated distances apart at points more nearly adjacent such trailing edge than at points more distant therefrom, and wherein the skins correspondingly converge, the skins and stiffeners being bonded together at a multiplicity of points to retain parts in their so-stressed relationship as a rigid, unitary structure.

3. A trailing edge structure as in claim 2, and a filling of foamed and solidified material within the approximately triangular spaces bounded by the arms of the stiffeners and the skins.

4. A lightweight structure useful as the trailing edge of an airfoil, and in use extending along such trailing edge, comprising a plurality of pairs of troughs, the troughs of each pair being disposed back to back, and the pairs being spaced along the trailing edge, oriented transversely thereto, an upper skin and a lower skin applied to and sandwiching the several pairs of troughs, said skins defining surfaces that converge at the trailing edge, and the troughs being of progressively lesser depth towards such trailing edge, in consonance with the convergence of the skins, to maintain contact with the latter, and the skins and the troughs being bonded together, to constitute a rigid, unitary structure.

5. A lightweight structure useful as the trailing edge of an airfoil, and in use extending along such trailing edge, comprising a plurality of pairs of troughs, the troughs of each pair being preliminarily secured together back to back, and the pairs being spaced along the trailing edge, oriented transversely thereto, an upper skin and a lower skin applied to and housing the several pairs of troughs, said skins defining surfaces that converge at the trailing edge, and extend past the ends of the troughs into contact with one another, and the troughs being of progressively lesser depth towards such trailing edge, in consonance with the convergence of the skins, the skins and troughs being joined, and the extended trailing edges of the skins being joined, by weld spots to constitute a rigid, unitary structure.

References Cited in the file of this patent

UNITED STATES PATENTS

| Number | Name | Date |
|---|---|---|
| 1,818,971 | Crichton | Aug. 18, 1931 |
| 2,233,969 | Woods | Mar. 4, 1941 |
| 2,312,546 | Hazard et al. | Mar. 2, 1943 |
| 2,382,356 | Watter | Aug. 14, 1945 |
| 2,620,552 | Jenkins | Dec. 9, 1952 |